United States Patent
Pandya et al.

(10) Patent No.: US 11,676,291 B1
(45) Date of Patent: Jun. 13, 2023

(54) ADAPTIVE MULTIMODAL SAFETY SYSTEMS AND METHODS

(71) Applicant: Everguard, Inc., Irvine, CA (US)

(72) Inventors: Sandeep Pandya, Irvine, CA (US); Sundeep Ahluwalia, San Diego, CA (US); Changsoo Jeong, Rancho Palos, CA (US); Michael Korkin, Glendale, CA (US); Kyungsuk Lee, Rancho Palos, CA (US); Christopher Ro, Aliso Viejo, CA (US); Yong Wu, Signal Hill, CA (US)

(73) Assignee: Everguard, Inc., Irvine, CA (US)

(*) Notice: Subject to any disclaimer, the term of this patent is extended or adjusted under 35 U.S.C. 154(b) by 27 days.

(21) Appl. No.: 17/232,646

(22) Filed: Apr. 16, 2021

Related U.S. Application Data

(60) Provisional application No. 63/012,734, filed on Apr. 20, 2020.

(51) Int. Cl.
  *G06T 7/70* (2017.01)
  *G06T 7/33* (2017.01)
  (Continued)

(52) U.S. Cl.
  CPC ............... *G06T 7/33* (2017.01); *G06T 5/009* (2013.01); *G06T 7/521* (2017.01); *G06T 7/70* (2017.01);
  (Continued)

(58) Field of Classification Search
  CPC .. G06T 7/33; G06T 7/521; G06T 7/70; G06T 5/009; G06T 2207/10028; G06V 20/20; G06V 2201/07
  See application file for complete search history.

(56) References Cited

U.S. PATENT DOCUMENTS

| | | |
|---|---|---|
| 2019/0209022 A1 | 7/2019 | Sobol et al. |
| 2019/0236370 A1 | 8/2019 | Man |
| (Continued) | | |

FOREIGN PATENT DOCUMENTS

| | | | | |
|---|---|---|---|---|
| CN | 104376348 A | * | 2/2015 | |
| CN | 107742141 A | * | 2/2018 | ............. G06F 21/31 |
| KR | 101907964 B1 | * | 10/2018 | |

OTHER PUBLICATIONS

"AI Insights fora Safer, Healthier and Productive Workforce." WearHealth, wearhealth.com/. Accessed on Apr. 22, 2020.
(Continued)

*Primary Examiner* — Matthew C Bella
*Assistant Examiner* — Kathleen M Broughton
(74) *Attorney, Agent, or Firm* — Wilson Sonsini Goodrich & Rosati

(57) ABSTRACT

An adaptive multimodal system is provided for managing safety in an industrial environment. The system comprises: a computer vision component for generating a computer vision output data; a real-time locating component for generating location data about an object within the industrial environment; a LIDAR component for generating 3D point cloud data of the industrial environment; and one or more processors coupled to the computer vision component, the real-time locating component and the LIDAR component and configured to: (i) obtain an identity of the object and the location data, and (ii) adjust, based at least in part on the identity and the location data, a pixel distribution for acquiring the 3D point cloud data, the process for generating the computer vision output data, or one or more parameters for acquiring an image data by the computer vision component.

20 Claims, 5 Drawing Sheets

(51) Int. Cl.
*G06T 7/521* (2017.01)
*G06T 5/00* (2006.01)
*G06V 20/20* (2022.01)

(52) U.S. Cl.
CPC .... *G06V 20/20* (2022.01); *G06T 2207/10028* (2013.01); *G06V 2201/07* (2022.01)

(56) References Cited

U.S. PATENT DOCUMENTS

| | | | |
|---|---|---|---|
| 2019/0258251 A1* | 8/2019 | Ditty | G06V 20/58 |
| 2019/0303759 A1 | 10/2019 | Farabet et al. | |
| 2020/0089942 A1* | 3/2020 | Man | G06N 7/005 |

OTHER PUBLICATIONS

"AI-Powered Workplace Safety." Intenseye, http://www.intenseye.com/. Accessed on Apr. 22, 2020.

Cheng et al. Automated task-level activity analysis through fusion of real time location sensors and worker's thoracic posture data; Automation in Construction 29 (2013) 24-39.

"Connected Safety." Home-HIS, safety.honeywell.com/en-us/software-and-services/connected-safety. Accessed on Apr. 22, 2020.

"Connected Worker Solutions." Intel, http://www.intel.com/content/www/us/en/connected-worker/overview.html. Accessed on Apr. 22, 2020.

Co-pending U.S. Appl. No. 17/241,737, inventors Pandya; Sandeep et al., filed on Apr. 27, 2021.

"DeepCanopy." DeepCanopy, http://www.deepcanopy.com/. Accessed on Apr. 22, 2020.

"Guardhat." Guardhat, http://www.guardhat.com/. Accessed on Apr. 22, 2020.

"Hitachi Solutions IoT Service Hub for Worker Safety." Hitachi Solutions, us.hitachi-solutions.com/products/hitachi-solutions-iot-service-hub-for-worker-safety/. Accessed on Apr. 22, 2020.

"Home: Safety First." Safetyfirst, margad.wixsite.com/safetyfirst. Accessed on Apr. 22, 2020.

Mandeljc et al. Tracking by identification using computer vision and radio; Sensors 13:241-273 (2013).

Smartvid.io, Inc. "Minimize Risk across Projects with the Smartvid.io Platform." Minimize Risk across Projects with the Smartvid.io Platform, http://www.smartvid.io/our-platform. Accessed on Apr. 22, 2020.

"Video Analytics Partner." EasyFlow, easyflow.biz/. Accessed on Apr. 22, 2020.

"Worker Insights." Worker Insights | IBM Watson IoT, http://www.ibm.com/internet-of-things/solutions/enterprise-asset-management/worker-insights. Accessed on Apr. 22, 2020.

"Worker Safety." HCL Technologies, http://www.hcltech.com/Internet-of-Things-IoT/our-solutions/worker-safety#an-introduction. Accessed on Apr. 22, 2020.

Zhang et al. A framework of on-site construction safety management using computer vision and real-time location system. International Conference on Smart Infrastructure and Construction 2019 (ICSIC); pp. 327-333; available at http://doi.org/10.icsic.64669.327.

\* cited by examiner

ADAPTIVE MULTIMODAL SAFETY SYSTEMS AND METHODS

CROSS-REFERENCE TO RELATED APPLICATIONS

This application claims the priority and benefit of U.S. Provisional Application No. 63/012,734, filed on Apr. 20, 2020, the entirety of which is incorporated herein by reference.

BACKGROUND

Safety and risk management in the industrial environment is critical. When safety monitoring is neglected, workplace injuries can result in devastating impact on workers, companies and industries. The alarming fact that 21% of workplace fatalities and injuries occur in construction is an indicator that dramatic safety improvements are needed on jobsites.

Safety and risk management in the industrial environment is challenging. It can encompass various aspects from safety protocol compliance, operational processes administration, collision avoidance, hazardous condition warning, fatigue monitoring, trip and fall detection to behavioral adherence of the workers or personnel. The conventional safety approach deployed in industrial context may rely on a combination of direct human supervision, CCTV monitoring, and passive alerts when safety protocols are breached which may cause clerical overload, lack of real time monitoring, situational awareness and insights into worker activity, machine operations or real-time proactive alerts.

SUMMARY

Recognized herein is a need for methods and systems for managing safety and risk in a hazardous workplace with improved efficiency and accuracy. The present disclosure provides systems and methods for managing safety and risk of personnel performing operations in hazardous environments. In particular, the provided systems and methods utilize artificial intelligence (AI) solution that scans through multi-sensor inputs in real-time and proactively alerts workers and managers to safety concerns. In some embodiments of the disclosure, the provided multimodal safety system includes computer vision, real-time locating system (RTLS), light detection and ranging (LIDAR) system and other sensors to provide a comprehensive coverage for each safety/work zone. The multimodal safety system of the present disclosure merges computer vision, real-time locating, AI, sensor fusion and analytics in combination with multiple sensors to provide real time, actionable oversight that ensures worker safety.

An aspect of the present disclosure provides an adaptive multimodal system. The adaptive multimodal system may employ a framework that is capable of dynamically adjusting the computing power available to the multimodal sensory systems. In particular, the adaptive multimodal framework may dynamically allocate computing power to the computer vision system for processing the image data based on an output of the real-time locating system and/or real-time conditions. Moreover, the adaptive multimodal framework may be capable of dynamically adjusting one or more imaging acquisition parameters of the computer vision system (e.g., zoom factor, spatial resolution, etc.) and/or LIDAR system based on the location tracking result (e.g., temporal-spatial data per identity) generated by the real-time locating system. This adaptive multimodal framework may fuse the multimodal sensory data dynamically based on real-time conditions which beneficially improves the accuracy and efficiency of providing understanding of the 3D target scene with reduced computation overhead and/or computational power.

In preferable embodiments of the present disclosure, the system comprises: a computer vision component for generating a computer vision output data; a real-time locating component for generating location data about an object within the industrial environment; a LIDAR component for generating 3D point cloud data of the industrial environment; and one or more processors coupled to the computer vision component, the real-time locating component and the LIDAR component and configured to: (i) obtain an identity of the object and the location data, and (ii) adjust, based at least in part on the identity and the location data, one or more parameters for acquiring the 3D point cloud data, the process for generating the computer vision output data, or one or more parameters for acquiring an image data by the computer vision component.

Additionally, the multimodal safety system also provides personal protective equipment (PPE) detection, safety zone compliance and fall detection, and various other functionalities. For example, upon detection of a safety infraction, workers may be immediately notified via haptic feedback on their personal alert device. Alert video and metadata are simultaneously sent to the safety manager portal for post-event analysis and coaching. The personal alert device may be a precise positioning wearable device showing worker and asset locations within less than 1.5 feet and can alert workers of danger zones and restricted areas before accidents happen. The personal alert device may be an industrial-grade wearable device.

Some embodiments of the present disclosure provide a platform allowing for real-time situational awareness and insights into worker activity thereby increasing productivity and ensuring workers are acting within safety requirements. Systems and methods of the present disclosure provide an end-to-end solution that offers actionable insights in real time. Systems and methods of the present disclosure combine computer vision and sensor fusion to provide safety at the edge for precise worker activity recognition. An analytics portal of the platform may deliver continuous safety data to help recognize improvements in worker behavior and operations management, as well as maintenance of equipment, and software applications running on the edge and the cloud.

The real-time platform of the present disclosure may cooperate ultra-accurate and reliable wearables with computer vision, machine learning and AI to improve productivity and safety. The platform may be configured for managing workplace safety and risk, detecting, predicting and managing risks in the industrial environment. The platform may comprise a multimodal industrial safety system utilizing machine learning and AI technologies to optimize fusion of multimodal data. In some embodiments of the disclosure, the multimodal safety system may utilize three different sensory modalities: a computer vision component, a real-time locating component, and a LIDAR component.

Each of the three modalities may have their own advantages and disadvantages. It is desirable to provide an intelligent system to fuse these modalities in an optimized manner to improve the accuracy and efficiency of providing a 3D scene map with understanding of the scene (e.g., location tracking, identity recognition, collision avoidance, fall and trip detection, accident or risk detection and prediction, etc.) thereby causing an appropriate action such as the delivery of individual or group alerts to workers, as well as other actions (e.g., interventions, control commands to machines to change operation state, etc.) to improve industrial safety.

Computer vision (CV) techniques or computer vision systems have been used to process images to extract high-level understanding of the scene (e.g., industrial workplace, construction site, etc.). CV techniques may have the capabilities of object detection, object tracking, action recognition or generating descriptions of a scene (e.g., object detection, object classification, extraction of the scene depth and estimation of relative positions of objects, extraction of objects' orientation in space, anomaly detection, detection of an unsafe situation, etc.). However, CV systems are known to have limited accuracy such as due to limited computational power. For example, deep convolutional neural networks are known to improve accuracy with an increased number of network layers. One source of inaccuracy in computer vision is the limited computational power, constrained by cost, size, weight, power, and heat dissipation. Another source of inaccuracy in computer vision is the limited resolution. An effective system resolution is a product of the intrinsic and extrinsic factors. Intrinsic factors may include, for example, optical blur of the camera's lens, focal length, and the spatial sampling rate of the image sensor. Extrinsic factors include illumination of the scene and its dynamic range. Target image brightness under given illumination is typically achieved by setting the exposure time. Longer exposure causes motion blur as a result of object motion or camera physical motion thereby reducing effective system resolution. To avoid motion blur, target image brightness may be achieved by increasing or decreasing the imaging system's gain. Increased gain amplifies signal noise which similarly reduces the effective system resolution. Furthermore, the location tracking by individual's identification is more challenging in industrial context or uniformed environments where individuals become visually indistinguishable due to similar uniform (e.g., PPE) which may result in errors in identity tracking.

Real-time locating system (RTLS) may automatically identify and track the location of objects or people in real time, usually within a building or other contained area. RTLS may involve using wireless RTLS tags attached to objects or worn by people, and in most RTLS, fixed reference points receive wireless signals from tags to determine their location. However, inaccuracy in the RTLS measurement can be caused by multi-path reflections of radio waves from objects in the scene, poor antenna sensitivity, weak radio signal strength, obstructions and occlusions in the line of sight between transceivers and signal attenuation by large metal objects.

Light detection and ranging (LIDAR) technology can be used to obtain three-dimensional information of an environment by measuring distances to objects. In contrast to the real-time locating systems that provide sparse scene coverage representing locations of a small number of mobile tags present in the scene (e.g., trajectories of individuals), LIDAR can provide a substantially dense three-dimensional representation of the scene. However, inaccuracy in LIDAR system may be caused by obstructions and occlusions in the line of sight which may lead to potential misclassification of environment and resolution in the 3D space.

The multimodal safety system or platform may combine the three different sensory modalities i.e., a computer vision component, a real-time locating component, and a LIDAR component via an intelligent fusion framework. In some cases, the multimodal safety system may be capable of detecting objects' locations in the scene and identifying them by utilizing mobile tag data provided by the real-time locating component and then tracking objects' orientation, relative positions and boundaries in three dimensions in real-time by using LIDAR point cloud data and camera images. In some cases, a proximity between two or more objects in the scene as determined by the system from mobile tag data, camera images and LIDAR data may cause an alert delivered to an individual worker or a group if such proximity falls below set thresholds to prevent a collision.

In some cases, the provided systems and methods may help individuals or workers to comply with safety protocols, improve situational awareness for hazardous environments and conditions, and enforce pro-active safety behaviors based on real-time tracking and unsafe situation detection.

In one aspect, an adaptive multimodal system for managing safety in an industrial environment is provided. The system comprises: a computer vision component for generating a computer vision output data; a real-time locating component for generating location data about an object within the industrial environment; a light detection and ranging (LIDAR) component for generating 3D point cloud data of the industrial environment; and one or more processors coupled to the computer vision component, the real-time locating component and the LIDAR component and configured to: obtain an identity of the object and the location data, and adjust, based at least in part on the identity and the location data, (i) a pixel distribution for acquiring the 3D point cloud data, and at least one of (ii) a process for generating the computer vision output data, and one or more parameters for acquiring an image data by the computer vision component.

In some embodiments, adjusting the process for generating the computer vision output data comprises not performing computer vision techniques for recognizing the identity of the object. In some embodiments, adjusting the process for generating the computer vision output data comprises performing action recognition or objection recognition for the object to determine whether the object complies with a safety protocol. In some cases, the one or more processors are configured to further adjust a computational resource allocated to the computer vision component.

In some embodiments, the computer vision output data comprises a description of the industrial environment. In some embodiments, the one or more parameters for acquiring the image data include a spatial resolution for acquiring the image data, a zoom level, a or region of interest to zoom-in. In some cases, the one or more processors are configured to further generate a control command to an imaging device of the computer vision component to adjust the one or more parameters.

In some embodiments, the real-time locating component comprises a mobile tag device carried by the object and one or more reference point devices deployed within the industrial environment. In some cases, the mobile tag device provides at least the identity of the object. In some embodiments, adjusting the pixel distribution for acquiring the 3D point cloud data comprises controlling a scanning pattern of the LIDAR component.

In a related yet separate aspect, a method for managing safety in an industrial environment is provided. The method comprises: generating a computer vision output data using a computer vision component; generating location data and an identity about an object within the industrial environment using a real-time locating component; generating 3D point cloud data of the industrial environment using a light detection and ranging (LIDAR) component; and adjusting, based at least in part on the identity and the location data, (i) a pixel distribution for acquiring the 3D point cloud data, and at least one of (ii) a process for generating the computer vision output data, and one or more parameters for acquiring an image data by the computer vision component.

In some embodiments, adjusting the process for generating the computer vision output data comprises not performing computer vision techniques for recognizing the identity of the object. Alternatively, adjusting the process for generating the computer vision output data comprises performing action recognition or objection recognition for the object to determine whether the object complies with a safety protocol. In some cases, the method further comprises adjusting a computational resource allocated to the computer vision component.

In some embodiments, the computer vision output data comprises a description of the industrial environment. In some embodiments, the one or more parameters for acquiring the image data include a spatial resolution for acquiring the image data, a zoom level, a or region of interest to zoom-in. In some cases, the method further comprises generating a control command to an imaging device of the computer vision component to adjust the one or more parameters.

In some embodiments, the real-time locating component comprises a mobile tag device carried by the object and one or more reference point devices deployed within the industrial environment. In some cases, the mobile tag device provides at least the identity of the object. In some embodiments, adjusting the pixel distribution for acquiring the 3D point cloud data comprises controlling a scanning pattern of the LIDAR component.

Example embodiments are described with reference to the management and monitoring of safety in an industrial environment (e.g., construction site). However, it is to be understood that the invention itself is more broadly applicable, and other example embodiments may be applied to the tracking of persons and objects and providing safety alert and actions in any place that may or may not be a workplace.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

Figure 1:
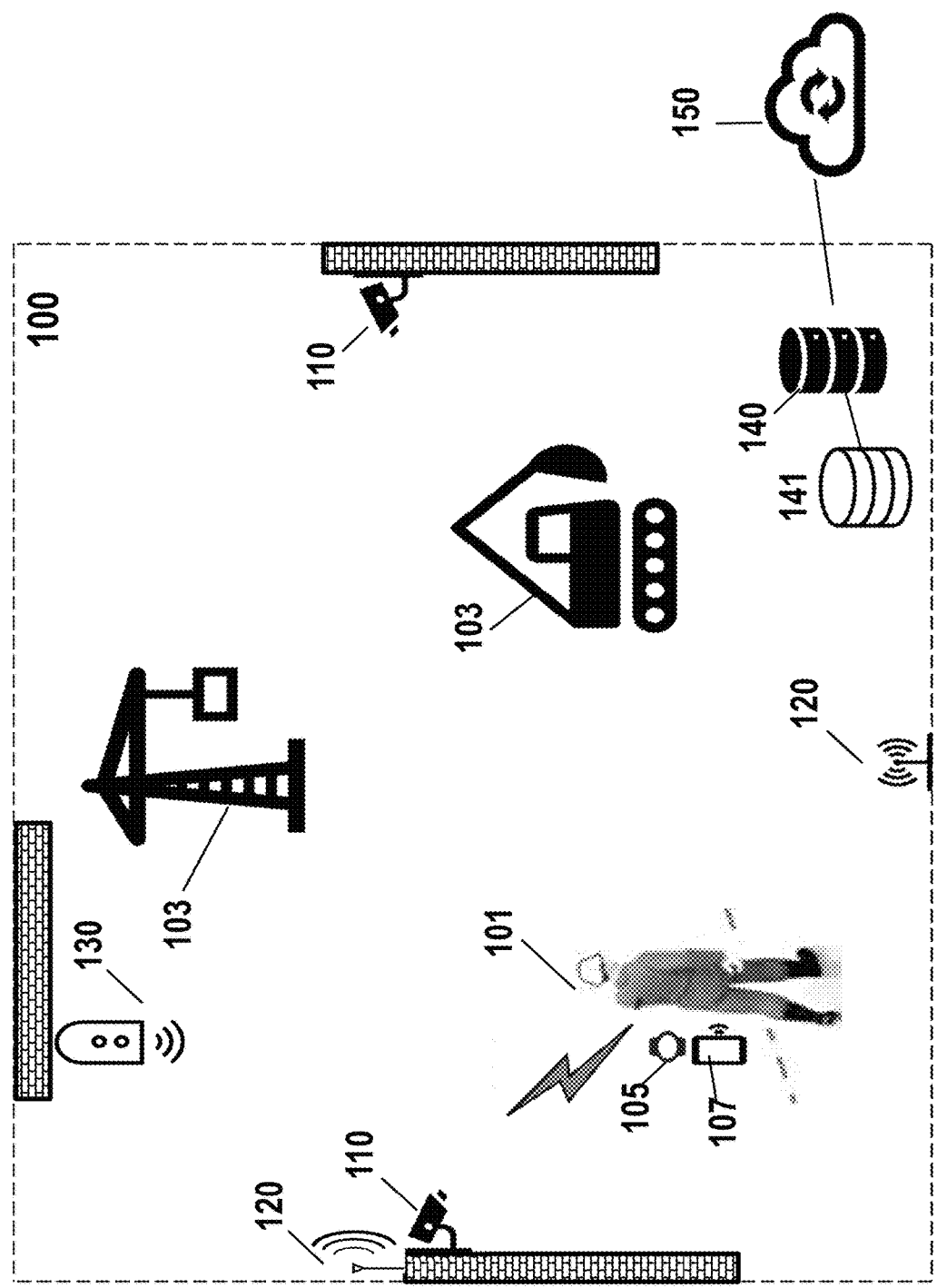
FIG. 1 schematically illustrates an adaptive multimodal safety system implemented in an industrial environment, in accordance with some embodiments of the present disclosure.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Certain Definitions

Unless otherwise defined, all technical terms used herein have the same meaning as commonly understood by one of ordinary skill in the art to which this invention belongs.

Reference throughout this specification to "some embodiments," or "an embodiment," means that a particular feature, structure, or characteristic described in connection with the embodiment is included in at least one embodiment. Thus, the appearances of the phrase "in some embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," "unit" and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In some cases, a component can emulate an electronic component via a virtual machine, e.g., within a cloud computing system.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form The term "real-time," as used herein, generally refers to a response time of less than 1 second, tenth of a second, hundredth of a second, a millisecond, or less, such as by a computer processor. Real-time can also refer to a simultaneous or substantially simultaneous occurrence of a first event with respect to occurrence of a second event. One or more operations in the present disclosure can be performed in real-time or near real-time.

The present disclosure provides methods and systems for safety management in a hazardous environment. The hazardous environment may be a remote workplace, an indoor workplace, an outdoor workplace, a place where hazardous work is conducted such as an industrial environment, a construction site, manufacturing plants and various others that can be dynamic, complex, and hazards can arise from the unsafe behavior of on-site personnel and/or equipment (e.g., machines, vehicles, etc.). The present disclosure may provide situational awareness functionality, safety management based on location tracking and unsafe situation detection that may be used in various contexts, including construction site, shipping, mining, healthcare, manufacturing environments and various other industries. The real-time location tracking, behavior enforcement and situational awareness functionality of the present disclosure may be used for various uses, such as Internet of Things (IoT) platforms, health-monitoring software applications and business processes or industrial workplace management, and for organizations in energy, manufacturing, aerospace, automotive, chemical, pharmaceutical, telecommunications, healthcare, the public sector, and others.

Adaptive Multimodal Safety System

The present disclosure provides systems and methods for managing safety in a hazardous workplace. In particular, the provided systems and methods can be applied to safety and risk detection or management related to various aspects of industrial workplace including, for example, worker's safety behavior change or guide, real-time alert or warning to workers, safety control of equipment to avoid collision or accident, location tracking of workers, materials or equipment's within a construction site, situational awareness of hazardous work, safety protocol compliance, and dealing with accidents and other events happening to the workers during operation.

The multimodal safety system may be a location and/or time-based system that may utilize real-time multimodal sensor data for incident detection, location tracking per identification, alerting, triggering safety operation of machines, and safety behavior compliance. In some cases, the multimodal safety system can analyze data collected from multi-modal sensory systems or devices to generate contextual descriptions of 3D scene which may include object detection, object classification, extraction of the scene depth and estimation of relative positions of objects, extraction of objects' orientation in space, anomaly detection, detection of an unsafe situation, identify safety operation processes, capture worker-based metrics (e.g., fatigue level, health condition, under-stress, physiological state, etc.), detect an incident (e.g., trip, slip or fall detection), identify a hazardous situation or hazardous conditions in a work zone of a workplace, identify an efficient workflow for one or more workers and one or more groups within a workplace and various others.

In other embodiments, multimodal sensory data may be collected from a computer vision system, a real-time locating system (RTLS), a LIDAR system and wearable sensors worn by or attached to personnel performing tasks within a workplace. The sensor data, processed data, and related data flow may be communicated over a network suitable for use in an industrial environment that may be indoor environment, outdoor environment, or a combination of both. In some cases, the environment may be dynamically changing (e.g., construction site). In some cases, the environment may be a remote area with limited wireless Internet or cellular network access, or an area without connection to a wide area network ("WAN") or an inter-network (e.g., the Internet).

This adaptive multimodal safety system may fuse the multimodal sensory data dynamically based on real-time conditions which beneficially improves the accuracy and efficiency of providing understanding of the 3D target scene with reduced computation overhead and/or computational power. The adaptive multimodal system may be capable of adapting to real-time conditions by employing a framework that is capable of dynamically adjusting the computing power allocated to the multimodal sensory systems and/or dynamically allocating resources for sensory data acquisition to further improve the safety monitoring performance of the system.

FIG. 1 schematically illustrates an adaptive multimodal safety system implemented in an industrial environment 100. The adaptive multimodal safety system may comprise a set of connected devices, one or more physiologic or kinematic sensors 105, an edge gateway (e.g., edge computing device/server) 140 for processing data collected from the multimodal sensory devices/systems 110, 120, 130 and providing real-time feedback to an individual 101 or user (e.g., onsite manager), and a backend management system 150 (e.g., cloud server).

In some embodiments of the present disclosure, the adaptive multimodal safety system may employ an edge intelligence paradigm that data processing and prediction/inference is performed at the edge or edge gateway 140 while the predictive models may be built, developed and trained on the backend management system 150 residing on a cloud/data center and run on a user device (e.g., hardware accelerator) deployed at the scene 100 and/or the edge computing device 140 for inference. For instance, sensor data stream may be sent to the on-site edge computing device 140 in real-time for managing on-site operations, safety and risk within a construction site, whereas a message package comprising batch data may be sent to a remote management console or the cloud at a lower frequency for post-event analysis. In some instances, the edge computing device may implement an adaptive multimodal framework. Details about the adaptive multimodal framework and data processing are described later herein.

In some cases, at least part of the adaptive multimodal safety system may be deployed in a hazardous worksite such as a construction site. In some situations, the worksite may be facilitated with local area network but may have limited wireless Internet or cellular network access particularly when the worksite is in a remote area that is remote from a wide area network ("WAN") or an inter-network (e.g., the Internet), or when the worksite is a temporary or dynamic worksite without sufficient network coverage. The worksite may have indoor and outdoor area or work/safety zones where operations, tasks and duties are performed.

Operations or tasks performed by one or more individuals 101 (e.g., workers, operators) may be tracked and guided based on real-time sensor data and feedbacks. In further embodiments of the disclosure, at least part of the sensor data may be captured by the multimodal sensory systems and one or more sensors from a user's electronic device, such as user's wearable device, mobile tag devices 105, and the like.

In some embodiments, an individual 101 (e.g., operator, worker) may be associated with one or more sensors. In some cases, an individual may be associated with one or more types of sensors that can be located on the individual's body (e.g., attached to skin), a part of body (e.g., wearable device or mobile tag devices 105) or clothing (e.g., PPE). In some cases, the one or more types of sensors may be located remotely from an individual, such as deployed in an environment (e.g. wall-mounted, attached to a machine, vehicle or other equipment, etc.) or located on a user device.

The user device may be a wearable device or a mobile tag device 105 provided to a worker 101. The user device may provide precise tracking of the individual 101 such as a mobile tag device. In some cases, the user device may be a precise positioning wearable device showing worker and asset locations within less than 1.5 feet and can alert workers of danger zones and restricted areas before accidents happen. The user device may be an industrial-grade wearable device. The user device may include other computing devices that are capable of presenting feedback information to a user. Examples of user devices may include, but are not limited to, mobile devices, smartphones/cellphones, tablets, personal digital assistants (PDAs), laptop or notebook computers, desktop computers, media content players, virtual reality systems, augmented reality systems, or microphones. The user device may be any electronic device capable of analyzing, receiving user input data (e.g., receiving user input for an incident report or trigger an emergency alert, etc.), providing or displaying certain types of feedback data (e.g., adverse event statistics, alert, behavior change cue, etc.) to a user. In some cases, a manager user device may be provided to one or more managers, supervisors or users allowing the them to monitor and view the real-time safety condition in the worksite.

In preferable embodiments of the present disclosure, the multimodal sensory systems and devices may comprise at least a computer vision-based system 110, a RTLS 120, 105 and LIDAR system 130. The multimodal sensory systems may further include various types of sensors carried/worn by or attached to the individuals 101 or an equipment 103. For example, one or more types of sensors may be included in a mobile tag device 105 worn by or attached to the individuals 101 or an equipment 103 (e.g., machine, vehicle, construction site equipment, asset, etc.).

In some embodiments of the present disclosure, the mobile tag device 105 may serve as a radio transmitter as part of the RTLS component for tracking identification/location of the individual 101 and/or equipment 103. For example, the mobile tag devices 105 may be BLE compatible or ultra-wideband (UWB) compatible so as to determine an individual's or mobile equipment's relative physical location to a beacon. In some cases, the mobile tag device 105 may be a precise positioning wearable device showing worker and asset locations within less than 1.5 feet and can alert workers of danger zones and restricted areas before accidents happen. The mobile tag device 105 may be an industrial-grade wearable device.

In yet another embodiment of the present disclosure, the mobile tag device 105 may include sensors such as physiologic sensors, kinematic sensors, audio sensors, inertial sensors (e.g., accelerometers, gyroscopes, and/or gravity detection sensors, which may form inertial measurement units (IMUs)), location sensors (e.g., global positioning system (GPS) sensors, mobile device transmitters enabling location triangulation), heart rate monitors, external temperature sensors, skin temperature sensors, skin conductance, neural signals (e.g. EEG), muscle signals (e.g. EMG), capacitive touch sensors, sensors configured to detect a galvanic skin response (GSR), vision sensors (e.g., imaging devices capable of detecting visible, infrared, or ultraviolet light, such as cameras), proximity or range sensors (e.g., ultrasonic sensors, lidar, time-of-flight or depth cameras), attitude sensors (e.g., compasses), pressure sensors (e.g., barometers), humidity sensors, vibration sensors, audio sensors (e.g., microphones), and/or field sensors (e.g., magnetometers, electromagnetic sensors, radio sensors). Sensor data provided by the mobile tag device may be analyzed along with the data collected from the multimodal sensory components to further improve the accuracy and understanding of the worksite safety conditions.

In some cases, the mobile tag device (e.g., wearable device 105) may be capable of delivering an alert (e.g., vibration, audio alarm, etc.) in response to a detection of an incident (e.g., trip, fall), an intervention for changing behavior (e.g., fatigue detection or heat exhaustion) or forecasting a hazardous situation (e.g., prediction of an impeding adverse event in a work zone or a physiological condition of the individual). For example, upon the prediction of an impending adverse event (e.g., entering a hazardous work zone, reaching a fatigue level, etc.), intervention such as rhythmic cue, audio, visual, or tactile stimulus may be delivered to the worker via the wearable device, mobile tag device 105 or sensors. In another example, upon detection of a safety infraction, workers may be immediately notified via haptic feedback on the mobile tag device 105. The alert video and metadata may be simultaneously sent to the safety manager portal for post-event analysis and coaching on the remote entity 150.

As described above, in some cases, the multimodal safety system may comprise connected sensors deployed in various locations within the environment 100 for detecting a hazardous situation or adverse event in the environment and providing warning or feedback information. In some situations, the environment may be a worksite that can have various regions or work zones which can be associated with a plurality of sensors deployed therein. The plurality of sensors may comprise cameras, LIDAR device and transceivers as part of the computer vision-based system 110, a RTLS component 120, 105 and LIDAR system 130. In some cases, sensors deployed within the worksite can further include, for example, a navigation system of a mobile worksite (e.g., vessel or ship) such as radar, sonar, differential global positioning system (DGPS), sensors on a user device such as inertial measurement unit (IMU), gyroscopes, magnetometers, accelerometers, audio sensors, conductivity sensors, ambient environment sensors such as temperature/heat sensors, chemical sensors, biological sensors, radiation sensors, or any other type of sensors, or combination thereof. The plurality of sensors deployed throughout the target scene may be used to detect ambient environment condition in a work zone, and/or work in conjunction with the sensor or user devices for location and time-based tracking, incident detection, and providing situational awareness to the individuals 101.

The computer vision-based system 110 may include one or more imaging devices (e.g., cameras) deployed at the worksite. Imaging devices may be deployed on stationary structures, such as the walls of the building, or on mobile equipment, such as cranes and vehicles. In some cases, the imaging device may be a video camera. The camera may comprise optical elements and image sensor for capturing image data. The image sensors may be configured to generate image data in response to wavelengths of light. A variety of image sensors may be employed for capturing image data such as complementary metal oxide semiconductor (CMOS) or charge-coupled device (CCD). In some cases, the image sensor may be provided on a circuit board. The circuit board may be a printed circuit board (PCB). The PCB may comprise a plurality of electronic elements for processing the image signal. For instance, the circuit for a CMOS sensor may comprise A/D converters and amplifiers to amplify and convert the analog signal provided by the CMOS sensor. Optionally, the image sensor may be integrated with amplifiers and converters to convert analog signal to digital signal such that a circuit board may not be required. In some cases, the output of the image sensor or the circuit board may be image data (digital signals) that can be further processed by a camera circuit or processors of the camera. In some cases, the image sensor may comprise an array of optical sensors.

In some cases, the camera may be a plenoptic camera having a main lens and additional micro lens array (MLA). The plenoptic camera model may be used to calculate a depth map of the captured image data. In some cases, the image data captured by the camera may be grayscale image with depth information at each pixel coordinate (i.e., depth map). The camera may be calibrated such that intrinsic camera parameters such as focal length, focus distance, distance between the MLA and image sensor, pixel size and the like are obtained for improving the depth measurement accuracy. Other parameters such as distortion coefficients may also be calibrated to rectify the image for metric depth measurement. The depth measurement may then be used for generating a 3D scene map and may be complemented by data provided by the RTLS component and LIDAR system.

As described above, the camera or the computer vision-based system 110 may perform pre-processing of the capture image data. In an embodiment, the pre-processing algorithm can include image processing algorithms, such as image smoothing, to mitigate the effect of sensor noise, or image histogram equalization to enhance the pixel intensity values. In some cases, one or more processors of the computer vision-based system 110 may use optical approaches as described elsewhere herein to generate a depth map of the target scene 100. For instance, an application programming interface (API) of the computer vision-based system 110 may output a focused image with depth map. Alternatively, the depth map may be generated by a safety inference engine of the system by fusing LIDAR data and camera data The RTLS component 120 may include a plurality of RTLS reference points, that can be transmitters, receivers, or transceivers deployed throughout the workplace 100 to provide the desired mobile tag coverage. The RTLS reference points may be a plurality of devices such as Beacon devices for indoor/outdoor positioning or wireless communication. In some cases, the local network may allow for indoor/outdoor position tracking, such as populating the indoor/outdoor space with Bluetooth Low Energy (BLE) beacons or alternatively UWB anchors that transmit a continuous stream of packets that are picked up by a BLE transceiver or an UWB transceiver on the mobile tag device 105 or the wearable device.

For instance, with BLE, a position of mobile tag devices 105 (e.g., wearable devices) can be identified based on the proximity technology. The proximity technology may include a plurality of beacons distributed about a premise through which an individual 101 or mobile equipment 103 is located or to navigate. The mobile tag devices 105 may be BLE compatible so as to determine an individual's or mobile equipment's relative physical location to a beacon. Based on ranging data or approximate distance between user's device to each beacon along with the unique beacon's properties, different level of positioning accuracy can be achieved. For instance, the proximity technology may determine the location of a mobile tag devices 105 based on a proximity estimate of signal strength emitting from beacon. In addition, it can be enhanced with a beacon triangulation method to determine the (x, y, z) local map coordinates of individual's position referencing to three or more beacons in proximity. The receiver can estimate its position using average of x,y,z localized coordinates of a floor map for e.g. (x1, y1, z1), (x2, y2, z2) and (x3, y3, z3). The RTLS component may employ any suitable ranging and/or angulating methods which may include, for example, angle of arrival, angle of departure, line-of-sight, time of arrival, time difference of arrival, two-way ranging, symmetrical double sided two way ranging, near-field electromagnetic ranging or any combination of the above.

The RTLS component may utilize any suitable technologies to provide real-time locating. For instance, the RTLS may employ ultra-wideband (UWB) technologies, ultrasound-based RTLS technologies, GPS-enabled RTLS, Wireless local area network, Bluetooth, and various other technologies to provide location tracking or proximity measurement. The accuracy may range from, for example, 0.1 m to 10 m. The RTLS component may select any combination of the aforementioned technologies to accommodate the deployment environment (e.g., indoor, outdoor, LAN availability, power consumption, accuracy requirement, etc.).

In some cases, the deployment of wireless radio transmitters (e.g., BLE sensors) within the worksite (e.g., construction site) may be designed to complement the deployment of the cameras of the computer vision system. A plurality of Beacon devices may be placed in various indoor locations, outdoor locations, or a combination of both. Deployment of the RTLS reference points may be designed such that the coverage of the RTLS component may at least partially overlap with the view of the computer vision system. This may beneficially supplement the location tracking per identity data to the descriptions of the 3D scene generated by the computer vision system.

The LIDAR (light detection and ranging) system 130 may obtain three-dimensional information of the target scene by measuring distances to objects. The LIDAR system 130 may comprise one or more LIDAR devices deployed throughout the worksite. The emitter of a LIDAR device may generate a sequence of light pulses emitted within short time durations such that the sequence of light pulses may be used to derive a distance measurement point. The LIDAR system may provide three-dimensional (3D) imaging (e.g., 3D point cloud) or further analysis (e.g., obstacles detection).

The LIDAR system may comprise one or more LIDAR devices deployed to any suitable locations within the worksite 100. The LIDAR system 130 may generate 3D point cloud data and/or analysis result (e.g., detection of an obstacle, detection of a collision, etc.). In some cases, the LIDAR system 130 may be configured to detect changes in the target scene (e.g., construction site) that may be relevant to safety of the workspace. For example, the changes detected by the LIDAR system may include new structures getting erected or taken down (i.e., construction progress), equipment installed or removed, materials delivered or removed from the scene, and other changes. Dynamic tracking of changes of the target scene may be utilized to estimate the precise location of workers in the target scene and the proximity between objects.

It is noted that the local network can have various other configurations or utilize other suitable techniques. For example, instead of or in addition to Beacons, proximity sensors such as radio or RFID beacons, Global Positioning System (GPS) beacons, wireless location beacons, or other reference features may be provided within an indoor area. The reference features may include visually discernible markers, IR-discernible markers, UV-discernible markers, and/or beacons that may emit a wireless signal. The wearable device may be equipped with the corresponding sensors (e.g., camera) to track the location of an individual relative to the location of the reference features.

As mentioned above, the multimodal safety system may employ an edge intelligence paradigm that data processing and inference is performed at the edge or edge computing server 140 (e.g., on-site server) while the predictive models may be built, developed and trained on a cloud/data center 150, and run on the edge computing server 140, user device such as dashboard tablet for onsite managers (e.g., hardware accelerator), personnel device (e.g., wearable device, mobile tag device 105) for inference.

In some cases, data managed or transmitted to the on-site edge computing server 140 may include, for example, data streams from the multimodal sensory systems/components, data from the personnel device such as the mobile tag device 105 or wearable device (e.g., motion data, physiological data, etc.) and/or user input data (e.g., user initiated report of an incident, alert, etc.). In some cases, data transmitted from the edge computing server 140 to the multimodal sensory systems/components may include control signals or instructions to adjust one or more parameters of the computer vision component or LIDAR component for sensory data acquisition (e.g., scanning pattern of LIDAR, zoom factor, tilt-pan control of cameras, etc.) and/or instructions related to image processing performed by the computer vision component.

In some cases, data may be transmitted from the edge computing server 140 to the personnel device which may include, for example, alert, warning, feedback instructions/guidance of worker behaviors or navigational information that is generated by the edge computing server 140. In some cases, the data generated by the edge computing server 140 may include warning signal or interventions to the individuals 101 or the equipment 103 (e.g., machines, vehicles, asset, etc.). For example, the data may include interventions delivered to the associated individual or control signals to an equipment. For instance, the interventions may comprise operations instructions/guidance to a worker in compliance with safety laws or protocols, and the control signals to an equipment may include a command to shut down or change a machine state of the equipment to avoid collision or other hazardous events. For example, the control signals may be delivered through machine's or equipment's PLC (programmable logic controller).

In optional cases, an additional user device 107 (e.g., tablet, mobile device) may be provided to a user. Alternatively, the user device may be the mobile tag device 105. The user device may be in communication with the edge computing server 140. Data transmitted from the user device to the edge computing server 140 may include, for example, user inputted data (e.g., confirmation of a task is completed), report provided by the worker, user-triggered alert (e.g., emergency alert) or a type of emergency. An individual or worker may also be permitted to trigger an alert via the user device or the mobile tag device. Data transmitted from the edge computing server to the user device may include, for example, alert, real-time information about a hazardous situation in the worksite, interventions and others as described above.

The edge computing server 140 may analyze the multimodal data streams with aid of an intelligent adaptive framework including one or more predictive models and/or anomaly detection models, the output result may be an alert indicating a detected incident such as fall or trip, or an anomaly, or a prediction of an impeding adverse event such as a hazardous condition in a work zone, and various other functionalities as described later herein. The edge computing server 140 may be coupled to a local database 141.

The local database 141 may comprise storage containing a variety of data consistent with disclosed embodiments. For example, the databases may store raw data collected from the user device 105, 107 (e.g., sensors and wearable device), data collected from the multimodal sensory systems 110, 120, 130, individual's or worksite's historical data, data about a predictive model (e.g., parameters, hyper-parameters, model architecture, threshold, rules, etc), data generated by a predictive model (e.g., intermediary results, output of a model, latent features, input and output of a component of the model system, etc.), incident report, record, workflow, safety protocols/law or regulatory related data, and user provided information (e.g., confirmation or denial of a prediction result, user information such as name, credential, or other user profile data, etc), algorithms, and the like. In certain embodiments, one or more of the local databases may be co-located with the edge computing server, may be co-located with one another on the local network, or may be located separately from other local devices. One of ordinary skill will recognize that the disclosed embodiments are not limited to the configuration and/or arrangement of the database(s).

The local database 141 may be one or more memory devices configured to store data. Additionally, the databases may also, in some embodiments, be implemented as a computer system with a storage device. In one aspect, the databases such as the local database and cloud databases may be used by components of the multimodal safety system to perform one or more operations consistent with the disclosed embodiments. One or more cloud databases and local database of the platform may utilize any suitable database techniques. For instance, structured query language (SQL) or "NoSQL" database may be utilized for storing the data transmitted from the edge computing system or the local network such as real-time data (e.g., location data, motion data, audio/video data, messages, etc.), processed data such as report, alert, historical data, predictive model or algorithms. Some of the databases may be implemented using various standard data-structures, such as an array, hash, (linked) list, struct, structured text file (e.g., XML), table, JavaScript Object Notation (JSON), NOSQL and/or the like. Such data-structures may be stored in memory and/or in (structured) files. In another alternative, an object-oriented database may be used. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. In some embodiments, the database may include a graph database that uses graph structures for semantic queries with nodes, edges and properties to represent and store data. If the database of the present invention is implemented as a data-structure, the use of the database of the present invention may be integrated into another component such as the component of the present invention. Also, the database may be implemented as a mix of data structures, objects, and relational structures. Databases may be consolidated and/or distributed in variations through standard data processing techniques. Portions of databases, e.g., tables, may be exported and/or imported and thus decentralized and/or integrated.

In some cases, batch data, and/or individual records, report and the like may be generated by the edge computing server. Some of the data may be stored in the local database 141, while some of the data may be transmitted to a remote cloud 150.

The remote cloud 150 may comprise one or more cloud applications such as a management console or cloud analytics portal that can be accessed by superintendents, managers, directors, auditors or third-party entities. For example, upon detection of a safety infraction, workers may be immediately notified via haptic feedback on their personal alert device (e.g., wearable device, mobile tag device, etc.). Alert video and metadata may be simultaneously sent to a safety manager portal of the management console for post-event analysis and coaching. The analytics portal may deliver continuous safety data to help recognize improvements on worker behavior and operations management, as well as maintenance of devices, applications running on the edge computing server and on the cloud. The third-party entity may access the cloud data repository or cloud applications for various purposes such as internal auditors, construction site state control inspection and various others.

Data captured by the multimodal sensory systems, wearable device, user devices, as well as real-time feedback data and management data may be communicated via a network architecture well-suited for use in an industrial environment. In some cases, the network architecture may comprise a local network that is within the worksite. The local network may employ a topology or configuration capable of operating in challenging environments where obstructions or distance prevent wireless communication from a device to a hub. For example, the local network may employ industrial grade WiFi Mesh technology providing stronger and more reliable Wi-Fi signals. Alternatively, or in addition to, the local network may be a mesh network where devices communication with each other without a centralized device, such as a hub, switch or router.

In some embodiments, the network architecture may comprise interconnect infrastructure or fabric such as purpose-built hardware, herein referred to as "gateways," which are compatible with a wireless protocol. The local network may have stationary configuration or dynamic configuration as described above, and the real-time data may be transmitted to the edge computing server 140 for analysis. The edge computing server 140 may be local to the worksite. The edge computing server 140 may be in communication with a remote cloud/data center 150 through the gateways for downloading trained predictive models, and transmitting data such as report data (e.g., incident report, data collected from the multimodal sensory system, etc.) and various others for further analysis and management. For instance, sensor data stream may be transmitted to the edge computing server 140 in real-time for managing worksite operations, safety and risk, whereas a message package comprising batch data may be sent to the cloud at a lower frequency. Details about the remote management system and edge computing system are described later herein.

In some embodiments, the local network may be a combination of wired and wireless network. In some embodiments, the local network may comprise a WiFi-beacon configuration. For example, the network configuration may comprise one or more WiFi Mesh access points and one or more beacons deployed within the worksite. The network of devices may be deployed to provide full network coverage at the worksite. In some cases, the deployment of the network devices may be determined based on the layout (e.g., indoor/outdoor layout) of the worksite, safety zone or work zone (e.g., location where tasks to be performed) such that a reliable network coverage is provided in the workplace. The plurality of sensors and/or mobile tag devices carried by the individuals or an equipment may be in communication with the edge computing device and/or a remote entity (e.g., cloud) via the wireless network. In some cases, the local network may comprise a communication unit such as a WiFi controller or switch responsible for deciding a data path or data link according to a routing table. The network may also comprise a gateway connecting the local network to a remote network or network entity (e.g., cloud). The gateway device may provide long range RF wireless coverage (e.g., DLPWAN) to connect the local network. The gateway devices may allow long range communications. In some cases, the long-range RF wireless coverage may be a narrowband wireless network coverage. In some cases, the gateway devices may employ any suitable coding or modulation scheme such as binary shift keying (BSK), direct sequence spread spectrum (DSSS), frequency hopping spread spectrum, or Gauss frequency-shift keying (GFSK), Quadrature Amplitude Modulation (QAM) or quadrature phase shift keying (QPSK), power amplification, forward error correction (FEC) and, various other data transmission methods. In some cases, the gateway devices may switch power amplification, bandwidth, and/or bitrate in real-time to optimize for signal quality, transmission rate, and/or battery life.

In some cases, the gateways may connect to a wide area network (e.g., Internet) or cloud using any TCP/IP or UDP-based capable backhaul, such as Ethernet, Wi-Fi or cellular 4G or 5G. The gateways may contain a radio frontend capable of listening to several MHz of RF wireless spectrum at a time, and/or configured to hear all network traffic transmitted within that spectrum. In some cases, the gateways may use synchronized frequency hopping schemes.

In some embodiments, the local network may be a combination of wired and wireless network. In some embodiments, the network configuration may comprise a plurality of Wi-Fi access points connected to a plurality of network switches or hubs (e.g., Ethernet switch), and one or more beacons. One or more Wi-Fi access points may be cable wired to one or more Ethernet switches. The plurality of network switches may be wire/cable connected to a power source. The network may also comprise a gateway such as the IS (Internet service) Wi-Fi access point to connect the local network to a remote network (e.g., Internet) or network entity.

In some embodiments, the local network may also comprise a plurality of devices such as Beacon devices for indoor/outdoor positioning or wireless communication. In some cases, the local network may allow for indoor/outdoor position tracking, such as populating the indoor/outdoor space with Bluetooth Low Energy (BLE) beacons that transmit a continuous stream of packets that are picked up by a BLE sensor on the mobile device or the wearable device.

Additionally, the network configuration may be dynamic. For example, one or more of the network devices may not be stationary within the worksite. In another example, the network configuration may be dynamically changing. In some cases, the local network may be a mesh network. In a mesh network, devices communication with each other without a centralized device, such as a hub, switch or router. In some cases, the network may be connected to a mesh network formed by a plurality of the sensors, mobile tag devices, or the wearable devices. The wireless mesh network may employ any suitable protocol, such as Wi-Fi, Bluetooth, BLE, Bluetooth Mesh, ZigBee, body area network (BAN), IrDA, ultra wide band (UWB), etc. For example, a Wi-Fi mesh network may be used to facilitate data transfer between the plurality of sensors and wearable devices. Sensory data collected by sensors located at different places may be transferred by hopping from one sensor to another until it reaches a destination (e.g., a local control unit, a central device, user device, gateway, etc.) according to a predetermined protocol across the mesh network. In some cases, a sensor in the mesh network may comprise a communication unit such as a Wi-Fi controller responsible for deciding a data path or data link according to a routing table. The mesh network may be low power consumption. The mesh network may be robust and reliable when a sensor is added or removed from the mesh network. A configuration of the mesh network may be configured to automatically adapt to an addition or removing of a sensor of the network. In some cases, the formation of a mesh network may not require a human set up. For example, once a sensor is placed on a wall surface or indoor room of a building, the sensor module may be automatically detected and become part of the mesh network. For instance, the sensor may check its routing table and other sensors in proximity to decide a data transfer path.

Adaptive Multimodal Safety Framework

An aspect of the present disclosure provides an adaptive multimodal framework. The adaptive multimodal framework is capable of dynamically adjusting the computing power allocated to the multimodal sensory systems and/or resources for sensor data acquisition. In particular, the adaptive multimodal framework may dynamically allocate computing power to the computer vision system for processing the image data based on an output of the RTLS component and/or real-time conditions. For instance, image processing methods and processes may be dynamically adjusted to generate an adaptive computer vision output data according to the identity and location of an object of interest provided by the RTLS component. Moreover, the adaptive multimodal framework may be capable of dynamically allocating the resources for sensory data acquisition by adjusting one or more imaging acquisition parameters of the computer vision system (e.g., zoom factor, spatial resolution, etc.) and/or a distribution of the spatial resolution of the LIDAR system based on the location tracking result (e.g., temporal-spatial data per identity) generated by the RTLS component. This may beneficially allow for fusing the multimodal sensory data dynamically thereby improving the accuracy and efficiency of producing understanding of the 3D scene with reduced computation overhead and/or computational power.

Figure 2:
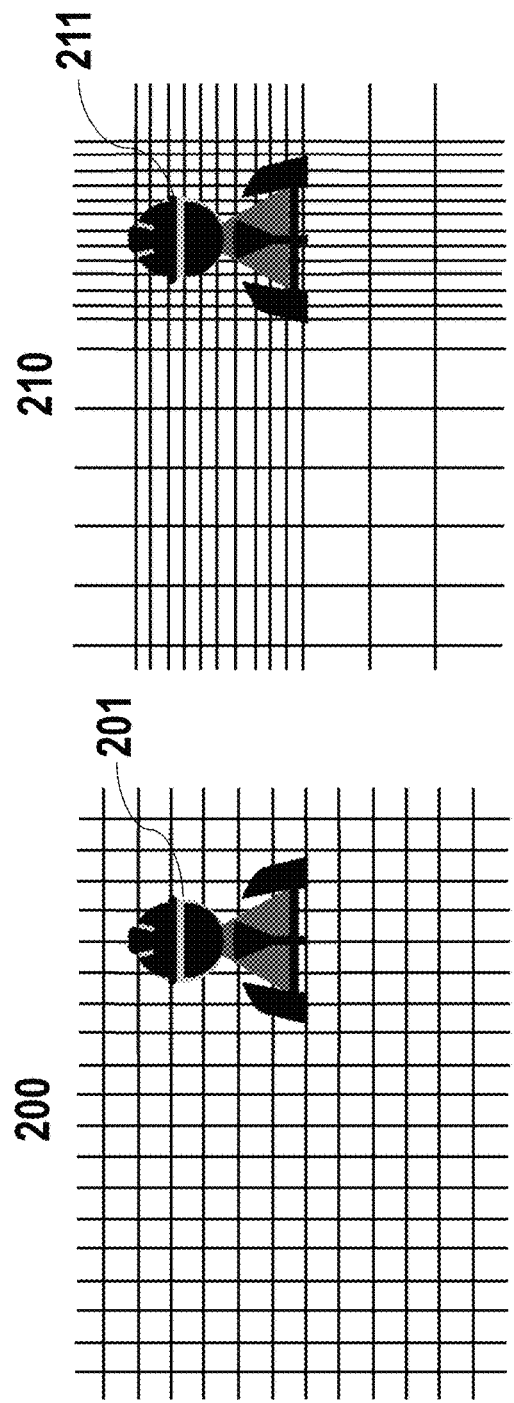
FIG. 2 shows examples of adaptive output of a LIDAR system and a computer vision system in an adaptive multimodal safety system, in accordance with some embodiments of the present disclosure.
Figure 2:
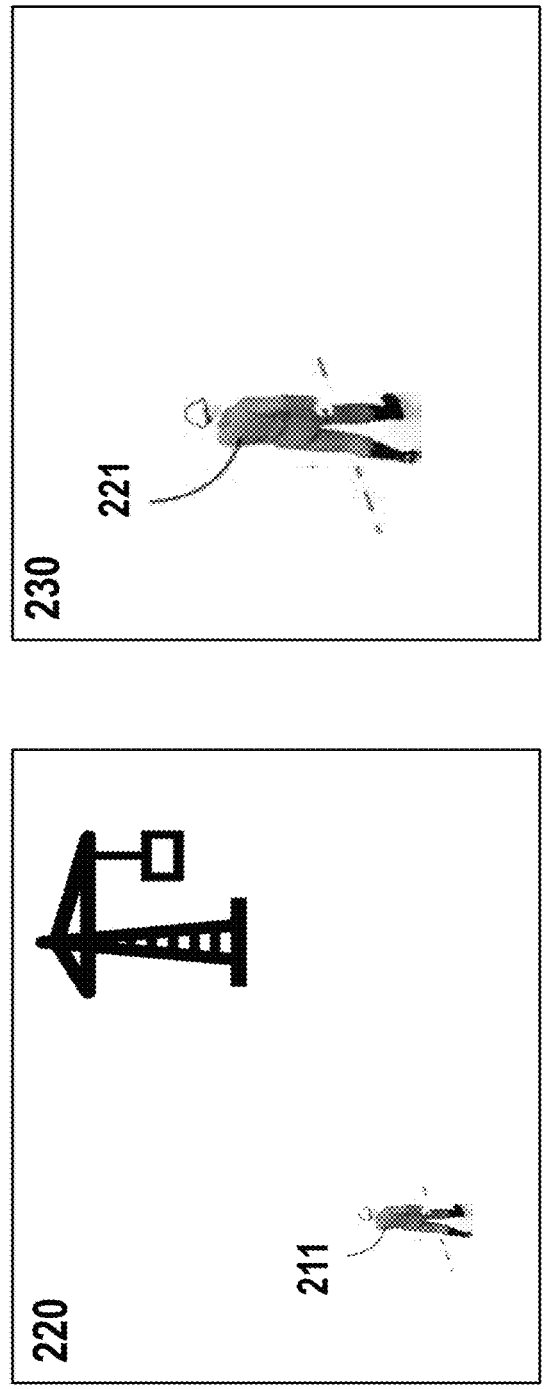

FIG. 2 shows examples of adaptive output of a LIDAR system and a computer vision system, in accordance with some embodiments of the present disclosure. In some embodiments of the adaptive multimodal safety system, the LIDAR system may dynamically adjust the spatial resolution of imaging based on real-time conditions. In some cases, the real-time conditions may include the detection of an object of interest by another sensory system. For instance, the detection of an object may include data about an identity of an object in a target scene (e.g., mobile tag device ID, worker ID, equipment ID, etc.) and locations/trajectory of the object provided by the RTLS component. In some instances, the real-time conditions may further include environmental conditions (e.g., complexity of an environment, changes in an environment) or a condition of the LIDAR system (e.g., power level).

As illustrated in FIG. 2, the LIDAR system may configure distribution and density of pixels/measurement points dynamically in response to real-time conditions. For instance, the LIDAR system may be capable of dynamically adjusting the resolution of laser beam points emitted into selected region in 3D space, and the x and/or y resolution of pixels in selected region in a 3D point cloud image 200, 210. In some situations, non-uniform pixels (points) distribution may be preferred so that dense light spots may be emitted into a selected region to provide more details in the region of interest. For instance, light spots may be preferred to be denser in a region where a target object is detected and further details are desired. This beneficially provides an adjustable resolution over a selected region thereby improving the sampling and computation efficiency of LIDAR imaging. FIG. 2 shows an example of pixel distribution is adjusted dynamically in response to the detection of a potential target 201. The pixel distribution may be adjusted by controlling an emitter of a LIDAR device (e.g., scanner, laser diode, etc.). For instance, a scanning pattern of an emitter of the LIDAR device may be adjusted by controlling a scanning motion of a scanner of the emitter.

As illustrated in the example, under a first operation setting of the LIDAR device 200, a target of interest 201 may be identified and further information related to the target of interest may be desired. In response to identifying of the target of interest (e.g., a worker 201, equipment, machine, etc.) and the location of the target in the field of view, the LIDAR device may adopt a second operation setting 210 such as by adjusting a drive signal generated to the scanning mirror of the LIDAR device and/or the light sources. The second operation setting may result in higher density of pixels or measurement points allocated to the region of the target of interest 211.

In some cases, the target of interest 201 such as identity of the target of interest and the location may be generated by the RTLS. For instance, location or trajectory of a worker or equipment in a construction site may be provided by a mobile tag device and upon receiving such location tracking per identity data, a region of interest (e.g., region in the 3D point cloud surrounding the worker or equipment) may be determined and the LIDAR system may allocate denser pixel distribution to the region of interest to provide detailed 3D measurement or further LIDAR analysis data (e.g., collision detection). As an example, a large piece of moving equipment, such as a crane with an extended three-dimensional shape may be identified by a mobile tag device attached thereto, and the 3D position and movement of the crane is more precisely tracked in the 3D scene relative to other objects by the LIDAR system by directing denser light spots into the region of interest for collision avoidance with objects that have no RTLS tags attached. Similarly, payload carried by a crane with no RTLS tag attached to it may be tracked by LIDAR more precisely when coming into dangerous proximity to a worker carrying RTLS tag.

In some cases, the adaptive multimodal safety system may dynamically adjust image processing performed by the computer vision system thereby producing an adaptive computer vision output data based on real-time conditions. For example, the adaptive multimodal safety system may reallocate available computational power fully or partially from detecting and identifying objects by the computer vision system to other processes when the locations of the objects and the identities are available from the RTLS. For example, upon determining the identity of a worker in the field of view (e.g., data generated by the mobile tag worn by the worker), the computer vision system may not perform object detection and recognition and/or facial identification of the worker from the image data. This may beneficially reduce a significant amount of computation which is required for facial recognition/identity recognition as well as reduce errors due to limited camera resolution, poor illumination, long distance from camera, workers wearing facial gear (e.g., personal protective equipment), and other limiting factors.

In some cases, the computer vision component of the adaptive multimodal safety system may also dynamically reallocate available spatial resolution from the entire field of view to smaller regions of interest by tracking the mobile tag or tags throughout the target scene. As illustrated in the example 220, an object of interest (e.g., worker 211) may be identified by the mobile tag worn by the worker, and in response to the detection, one or more imaging acquisition parameters of a pan-tilt-zoom camera may be controlled to track the mobile tag or tags throughout the target scene and dynamically zoom-in on the objects 221 wearing tags. Optical zoom can provide higher resolvability of detail 220 than a full field of view image 220. For instance, the image with higher resolution 230 may provide further details or analysis about the workers wearing the mobile tags which can include verification of personal protective equipment, verification of proper use of tools, detection of unsafe posture or behavior, hand gestures/signals and various other details that may not be accurately resolved with a lower resolution.

Figure 3:
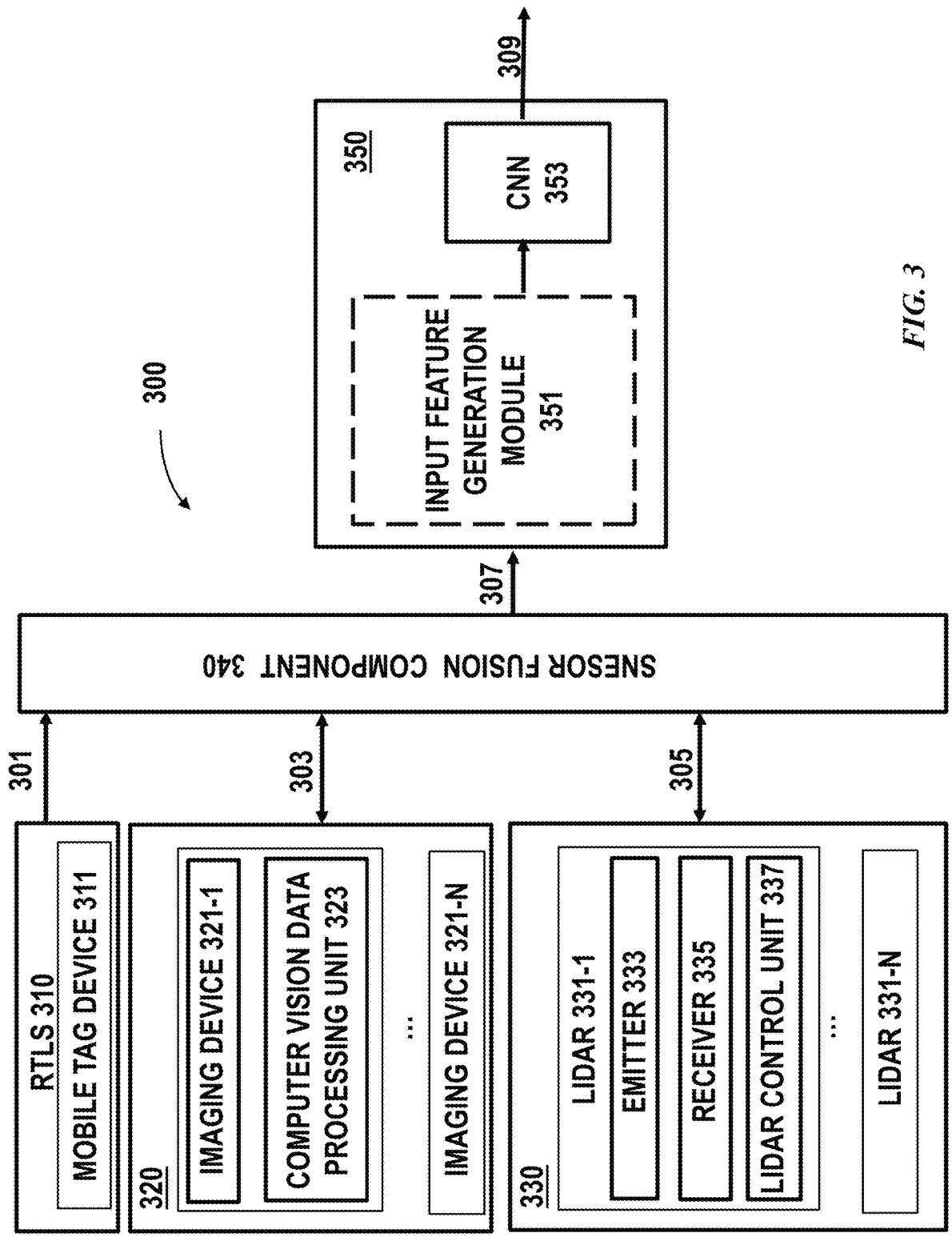
FIG. 3 schematically illustrates an adaptive multimodal framework for dynamically controlling the multimodal sensor systems, and fusing and processing multimodal sensory data to generate an output for safety purpose.

FIG. 3 schematically illustrates an adaptive multimodal framework 300 for dynamically controlling the multimodal sensor systems, fusing and processing multimodal sensory data to generate an output for safety purpose. In some embodiments, the adaptive multimodal framework 300 may comprise a real-time locating system (RTLS) 310, a computer vision system 320, a LIDAR system 330, a sensor fusion component 340 and an intelligent safety inference engine 350.

In some embodiments, the output 309 of the safety inference engine 350 may include safety related results such as a detected or predicted accident or adverse event within the target scene (e.g., construction site). The safety related results may include, but not limited to, detection of an incident (e.g., trip, slip, fall), detection of impeding collision, detection of fatigue level, predicting/forecasting a hazardous zone or condition and various others. As an example, the output may be detection and tracking of a large piece of moving equipment, such as a crane with a variable three-dimensional shape and orientation in space relative to other objects present in the target scene, including workers wearing mobile tags, other mobile and stationary equipment, and the building structures that have no tags attached thereto.

In some cases, the output 309 may cause action such as an alert, warning, guidance delivered to the associated individual via the wearable device or mobile tag device. For example, action may include warnings about a hazardous condition on a worksite which can be generated and delivered to the individual prior to the individual entering the hazardous work zone or to warn the individual about a collision event. In some cases, an impeding hazardous event or hazardous condition may be predicted or forecasted. For example, the safety inference engine may be capable of forecasting an impeding adverse event a certain timespan before the occurrence of the event. The forecasting or prediction of an impending adverse event may be generated using a trained model.

In some embodiments, a warning signal and interventions can be proactively suggested. For example, the output 309 may further include interventions delivered to the associated individual or control signals to an equipment. For instance, the interventions to the workers may comprise workflow or operations instructions/guidance to a worker, training or coaching, navigational information to guide the worker within a construction site and the like. The interventions to the machines or equipment in a worksite may include, for example, control signals to the equipment to shut down or change a machine state of the equipment to avoid collision or other hazardous events. Control signals to the equipment may be delivered as commands to PLC (programmable logic controller) which controls the equipment.

The output 309 may be generated by the safety inference engine 350. In some embodiments, the safety inference engine 213 may include an input feature generation module 351 and a trained predictive model 353. For example, the detection of an incident (e.g., trip, slip, fall, collision), detection of behavior not in compliance with safety protocol (e.g., not wear PPE, outside of safety zone), detection of fatigue level, predicting a hazardous zone or condition, predicting a collision may be provided using the predictive model 353. A predictive model may be a trained model or trained using machine learning algorithm. The machine learning algorithm can be any type of machine learning network such as: a support vector machine (SVM), a naïve Bayes classification, a linear regression model, a quantile regression model, a logistic regression model, a random forest, a neural network, convolutional neural network CNN, recurrent neural network RNN, a gradient-boosted classifier or repressor, or another supervised or unsupervised machine learning algorithm (e.g., generative adversarial network (GAN), Cycle-GAN, etc.).

The input feature generation module 351 may generate input feature data to be processed by the trained predictive model 353. In some embodiments, the input feature generation module 351 may receive data from the computer vision system 320, the LIDAR system 330, and the real-time locating system 310, extract features and generate the input feature data. In some embodiments, the data 307 received from the computer vision system, the LIDAR system, and the RTLS may include raw sensor data (e.g., image data, LIDAR data, time-series location data, etc.). In some cases, the input feature generation module 307 may pre-process the raw sensor data (e.g., data alignment) generated by the multiple different sensory systems (e.g., sensors may capture data at different frequency) or from different sources (e.g., third-party application data). For example, data captured by camera, LIDAR, RTLS and telemetry data (e.g., temperature, physiologic data, IMU data, etc.) may be aligned with respect to time and/or identification (e.g., device ID, worker ID, equipment ID, etc.).

The data 307 received from the computer vision system, the LIDAR system, and the RTLS may include processed data. For example, data from the computer vision system 320 may include descriptions of the target scene (e.g., construction site) such as object detection, object classification, extraction of the scene depth and estimation of relative positions of objects, extraction of objects' orientation in space, anomaly detection, detection of an unsafe situation, or other descriptions. In some cases, the data provided by the computer vision system may be generated using an optical technique that may not be as computationally expensive as using the computer vision system alone. At least some of the functionalities of the CV system can be replaced by or supplemented by the RTLS or LIDAR system. For instance, accuracy and efficiency of detecting and identifying objects in the scene via computer vision may be advantageously complemented by utilizing the location data of such objects and the object identities as provided by the RTLS. For example, the identity of a person wearing a tag in the field of view may be determined based on the mobile tag ID without performing CV techniques to detect the person or perform facial recognition from captured image. In another example, the identity of an equipment may be determined based on the mobile tag ID without performing object recognition techniques (i.e., CV techniques).

In some cases, the data 307 received from the multimodal sensory systems may be adaptive to real-time conditions. For instance, the data 307 may be produced by dynamically allocating computational powers and/or resources for sensory data acquisition among the computer vision system 320, and/or the LIDAR system 330 by the sensor fusion component 340.

The sensor fusion component 340 may be operably coupled to the RTLS 310, computer vision system 320, and the LIDAR system 330 to receive the respective output data. In some cases, the output data produced by the computer vision system 320, and/or the LIDAR system 330 may be dynamically adjusted based on the output data generated by the RTLS 310.

The RTLS 310 may generate RTLS output data 301 by processing the radio signals as described above using one and some combination of ranging and/or angulating methods to determine location. The ranging and/or angulating methods may include, for example, angle of departure, line-of-sight, time of arrival, time difference of arrival, two-way ranging, symmetrical double sided two way ranging, near-field electromagnetic ranging or other methods as described in FIG. 1. The RTLS 310 can be the same as the RTLS component as described in FIG. 1. For example, the RTLS may include a plurality RTLS reference points devices (e.g., transmitters or receivers), deployed throughout the target scene to provide the desired mobile tag coverage as well as a plurality of mobile tags attached to the individuals and/or equipment (e.g., vehicles, machines, asset, etc.) within the scene.

The RTLS may include a plurality of mobile tag devices 311. The mobile tag device can be the same as the mobile tag device as described in FIG. 1. For example, the mobile tag device may comprise one or more sensors for detecting a position, orientation or motion state (e.g., speed, acceleration, etc.) of an individual who wears the mobile tag device or a movable object carries the mobile tag device. The one or more sensors may include at least an inertial measurement member. The inertial measurement member may comprise one or more gyroscopes, velocity sensors, accelerometers, magnetometers, and one or more location sensors. The inertial sensor may be used for obtaining data indicative of a spatial disposition (e.g., position, orientation, or angle) and/or motion characteristic (e.g., translational (linear) velocity, angular velocity, translational (linear) acceleration, angular acceleration) of the movable object. An inertial sensor may be used herein to refer to a motion sensor (e.g., a velocity sensor, an acceleration sensor such as an accelerometer), an orientation sensor (e.g., a gyroscope, inclinometer), or an IMU having one or more integrated motion sensors and/or one or more integrated orientation sensors. An inertial sensor may provide sensing data relative to a single axis of motion. The axis of motion may correspond to an axis of the inertial sensor (e.g., a longitudinal axis). A plurality of inertial sensors can be used, with each inertial sensor providing measurements along a different axis of motion. For example, three angular accelerometers can be used to provide angular acceleration data along three different axes of motion. The three directions of motion may be orthogonal axes. One or more of the angular accelerometers may be configured to measure acceleration around a rotational axis. As another example, three gyroscopes can be used to provide orientation data about three different axes of rotation. The three axes of rotation may be orthogonal axes (e.g., roll axis, pitch axis, yaw axis). Alternatively, at least some or all of the inertial sensors may provide measurement relative to the same axes of motion. Such redundancy may be implemented, for instance, to improve measurement accuracy. Optionally, a single inertial sensor may be capable of providing sensing data relative to a plurality of axes. For example, an IMU including a plurality of accelerometers and gyroscopes can be used to generate acceleration data and orientation data with respect to up to six axes of motion.

In some embodiments, the RTLS output data 301 may comprise at least time-series of location data (e.g., proximity data), identification data (e.g., device ID, worker ID, equipment ID, etc.) and the motion data (e.g., IMU data). The RTLS output data 310 may not be captured at the same frequency as capturing the image data by the CV system or the LIDAR system. In some cases, the different types data may be combined with respect to time (e.g., time stamp) and/or identifies of the object.

In some cases, data 303 communicated between the sensor fusion component 340 and the computer vision system 320 may include at least computer vision output data and control signals/command generated by the sensor fusion component 340.

The computer vision system 330 may adopt any suitable optical techniques to generate the computer vision (CV) output data (e.g., 3D or depth information of the target scene). For example, the CV output data may be generated using passive methods that only require images, or active methods that require controlled light to be projected into the target scene. Passive methods may include, for example, thermal image acquisition, object recognition, stereoscopy, monocular shape-from-motion, shape-from-shading, and Simultaneous Localization and Mapping (SLAM) and active methods may include, for example structured light and Time-of-Flight (ToF). In some cases, computer vision techniques such as optical flow, computational stereo approaches, iterative method combined with predictive models, machine learning approaches, predictive filtering or any non-rigid registration methods may be used to generate the descriptions of the 3D scene.

The sensor fusion component 340 may dynamically allocate computing power to the computer vision system for processing the image data based on an output of the RTLS system and/or real-time conditions. The sensor fusion component 340 may also dynamically allocate resources for acquiring the raw sensory data (e.g., image data). In some cases, the sensor fusion component 340 may generate control signals/command to control one or more imaging devices 321-1, 321-N of the computer vision system 320 and/or data processing of the computer vision system. For example, the sensor fusion component 340 may receive the RTLS output data 301 including location/trajectory tracking of an object of interest (e.g., worker, equipment, etc.), and in response to determining the identity and location of an object is available, the sensor fusion component may generate an instruction to a computer vision data processing unit 323 about image processing to be performed to the object. For instance, the instruction may include a coordinate of the region of interest in the field of view presenting the identified object, and particular image processing methods to be performed within the region of interest. For example, if the identity indicates the object of interest is a worker, the instruction may indicate not to perform facial recognition on the object whereas object recognition may be performed to identify a behavior of the worker. For instance, behavior identification or action/object recognition may be performed to verify if the worker's behavior/actions comply with a safety protocol such as whether the worker wears a PPE or whether the operations are in compliance. In some cases, the image processing methods to be performed may be determined based on the identity of the object of interest. In some cases, upon determining the specific task to be performed on the recognized object (e.g., behavior identification, action classification, object recognition, PPE identification, etc.), the computational power/resource such as CPU/GPU cores or the accelerator for performing the specific task may be utilized to execute the program instructions.

In some cases, concurrently with generating an instruction to the computer vision data processing unit 323, control signals/commands to one or more imaging devices of 321-1, 321-N of the computer vision system 320 may be generated.

The control signals/commands may be transmitted to a selected imaging device to adjust one or more imaging acquisition parameters of the imaging device (e.g., zoom factor, spatial resolution, frame rate, exposure time, pan and tilt, etc.). The imaging device may be selected based on the location of the object of interest identified in the RTLS output data. The one or more imaging acquisition parameters may be determined based on the identity and/or location of the object of interest identified in the RTLS output data. For example, the one or more parameters may be dynamically adjusted to zoom-in on the object of interest to further track the behavior/movement of the object of interest.

In some cases, the control signals/commands may control the operation of a camera (e.g., taking still or moving pictures, zooming in or out, zoom level, turning on or off, switching imaging modes, changing image resolution, adjusting focus, changing depth of field, changing exposure time, changing viewing angle or field of view). As an example, the control signals/commands may control an optical assembly of a selected imaging device 321-1 to achieve a desired zoom level in a region of interest. The optical assembly may comprise components that are useful for adjusting a light path, line of sight, field of view and the like. For instance, the optical assembly may include zoom lens for which the focal length or angle of view can be varied. The imaging device may provide optical zoom by adjusting focal length of the zoom lens. For instance, one or more lenses may slide along an optical axis to adjust a focal length such that a designed zoom level or magnification level can be achieved. The focal length may be increased when zooming in, and the focal length may be decreased when zooming out. The focal length may be adjusted by moving the one or more lenses along the optical axis relative to an imaging sensor. The focal length may be adjusted by moving the imaging sensor along the optical axis relative to the one or more lenses. The focal length may be adjusted by moving both the imaging sensor and the one or more lenses such that a distance between imaging sensor and the lenses is adjusted. In another example, the control signals/commands may control of the pan, tilt angle of camera to track an object of interest. For instance, the camera may be mounted to a movable support such that a line of sight or orientation of the camera can be controlled by actuating the support.

The LIDAR (light detection and ranging) system 330 may obtain three-dimensional information of the target scene by measuring distances to objects. In some cases, the LIDAR system 330 may include one or more LIDAR devices 331-1, 331-N. For example, the emitter 333 of a LIDAR device 331-1 may generate a sequence of light pulses emitted within short time durations, and the receiver 333 may comprise one or more detectors configured to receive the echo light pulses to derive a distance measurement point. The LIDAR device/system may provide three-dimensional (3D) imaging (e.g., 3D point cloud) or further analysis (e.g., obstacles detection or collision avoidance).

The data 305 communicated between the LIDAR system and the sensor fusion component may comprise LIDAR output data and control signals/commands generated by the sensor fusion component. The LIDAR output data may include the 3D point cloud data and/or analysis result (e.g., detection of an obstacle, detection of a collision, etc.). The LIDAR system 330 can be the same as the LIDAR component as described in FIG. 1 or FIG. 2.

In some cases, the sensor fusion component 340 may generate control signals/command to control one or more LIDAR devices 331-1, 331-N of the LIDAR system 330 to dynamically adjust a spatial resolution. The sensor fusion component 340 may dynamically adjust pixel distribution of the 3D point cloud based on an output of the RTLS system and/or real-time conditions. For example, the sensor fusion component 340 may receive the RTLS output data 301 including location/trajectory tracking of an object of interest (e.g., worker, equipment, etc.) as well as the identity of the object, the sensor fusion component 340 may then generate an instruction to a selected LIDAR device 331-1 based on the location of the object of interest and the field of view of the LIDAR device.

In some cases, the instruction may include a region of interest in the field of view presenting the identified object, desired spatial resolution allocated to the region of interest, and/or further analysis to be performed. For instance, if the identity provided by a mobile tag device indicates the object of interest is a worker, the instruction may include information about the area and coordinate of the region of interest surrounding the worker and collision prediction may be performed at a higher frequency than other regions in the field of view.

In some cases, the control signals/command may be generated to affect the pixel distribution and/or scanning pattern of a selected LIDAR device. The pixel distribution may be adjusted by controlling an emitter 333 of a LIDAR device (e.g., scanner, laser diode, etc.). For instance, a scanning pattern of the LIDAR device may be adjusted by controlling a scanning motion of a scanner of the emitter. For example, the scanning mirror may be controlled to follow a scan path that substantially covers the field of view (FOV) and the scan path may result in a point cloud with pixels that substantially cover the FOV. The pixels may be distributed across the FOV according to the scanning pattern. The movement of the scanning mirror may be controlled by the LIDAR control unit 337 such that the pixels may have a particular non-uniform distribution (e.g., the pixels may have a higher density in one or more selected regions of the FOV).

The sensor fusion component 340 may generate the commands or control signals based on pre-determined rules (e.g., handcrafted rules). Alternatively, or in addition to, the command or control signals may be generated using a machine learning trained model. For instance, the input data to the machine learning trained model may include the RTLS output data 301, and the output of the trained model may be commands or control signals to be sent to the computer vision system 320 and/or LIDAR system 330.

The functions, methods or the one or more components described (e.g., sensor fusion component, input feature generation module) may be implemented using software, hardware or firmware or a combination thereof. For example, the components may comprise one or more processors and at least one memory for storing program instructions. As used herein a processor encompasses one or more processors, for example a single processor, or a plurality of processors of a distributed processing system for example. A controller or processor as described herein generally comprises a tangible medium to store instructions to implement steps of a process, and the processor may comprise one or more of a central processing unit, programmable array logic, gate array logic, or a field programmable gate array, for example. In some cases, the one or more processors may be a programmable processor (e.g., a central processing unit (CPU) or a microcontroller), a graphic processing unit (GPU), digital signal processors (DSPs), a field programmable gate array (FPGA) and/or system on chip (SoC). In some cases, the one or more processors may be operatively coupled to a non-transitory computer readable medium. The non-transitory computer readable medium can store logic, code, and/or program instructions executable by the one or more processors unit for performing one or more steps. The non-transitory computer readable medium can include one or more memory units (e.g., removable media or external storage such as an SD card or random access memory (RAM)). One or more methods, algorithms or operations disclosed herein can be implemented in hardware components or combinations of hardware and software such as, for example, ASICs, special purpose computers, or general-purpose computers.

The dynamic allocation of computational power may include allocation of the one or more graphics processing units (GPUs) and/or GPU cores, the one or more general purpose central processing units (CPUs) and/or CPU cores, accelerators, programmable accelerators for perception tasks from sensor data (e.g., data from cameras, LIDAR), deep learning accelerators to run a specific neural network (usually has better performance per watt performance than the same network would have if executed on a general-purpose CPU, GPU, or FPGA), one or more storage elements (e.g., RAM, SRAM, DRAM, VRAM, Flash, hard disks, on-chip storage, and may be comprise caches for use with the CPU and/or the GPU) to perform computer vision, data processing for other sensing modalities and sensing fusion. For example, the number of CPU or GPU cores and/or memory may be allocated to perform computer vision based on an output of the real-time locating system and/or real-time conditions as described above.

Figure 4:
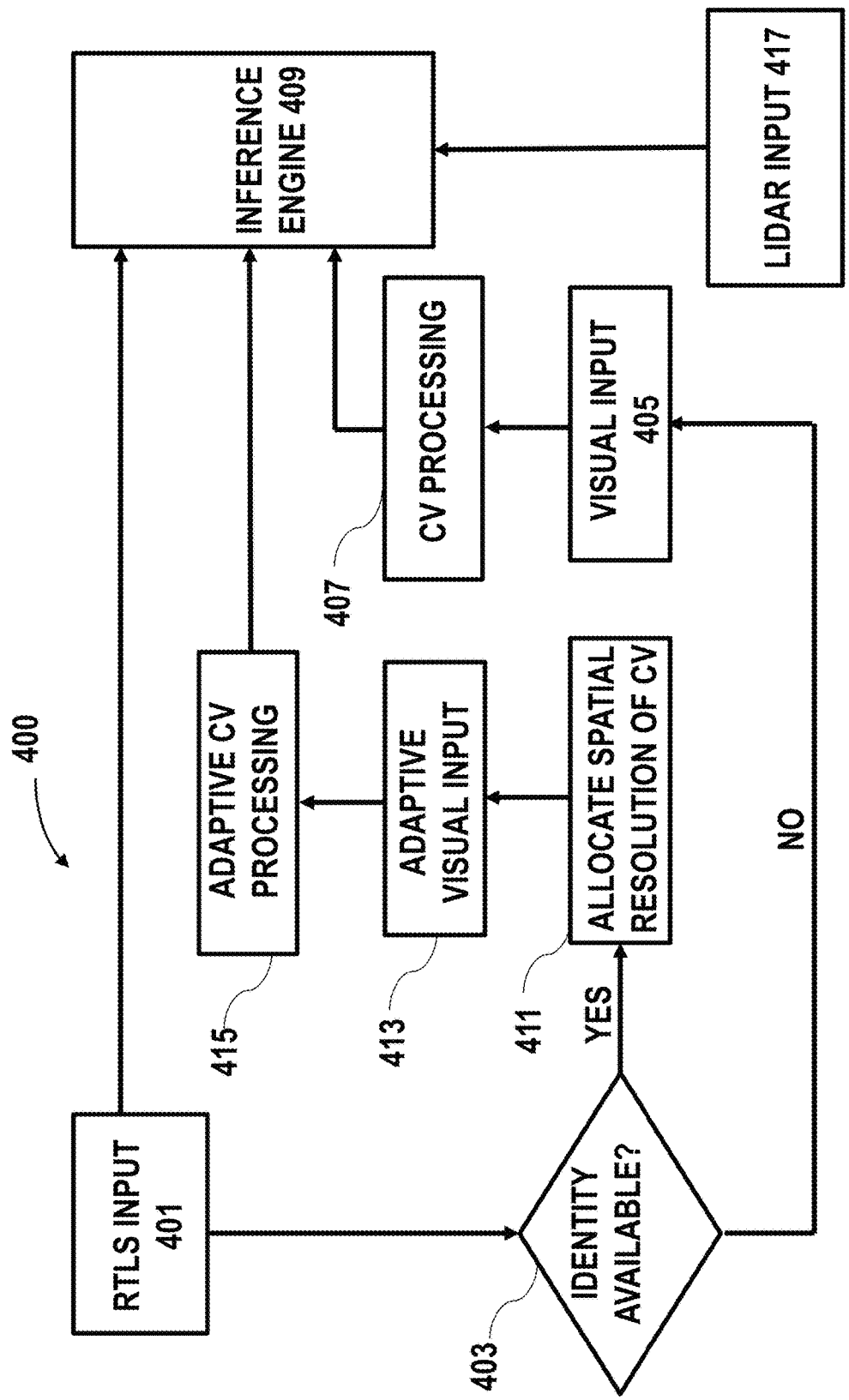
FIG. 4 illustrates an example of a method for providing adaptive multimodal safety analysis, in accordance with some embodiments of the present disclosure.

FIG. 4 illustrates an example of a method 400 for providing adaptive multimodal safety analysis, in accordance with some embodiments of the present disclosure. The method may comprise receiving input data 401 from a real-time locating system. The RTLS input data 401 may be processed to extract identity of an object of interest in a 3D scene (e.g., construction site) and the associated location data (operation 403). If the identity and the location data is available, higher spatial resolution of the computer vision component may be allocated to a region that presents the object of interest (operation 411), and the visual input (to the inference engine) provided by the computer vision component may be adjusted (operation 413). The visual input may be adjusted by controlling one or more acquisition parameters of the visual input device (e.g., camera zoom level, image acquisition rate, focal length, tilt/pan angle, etc.) to track the object of interest and to provide further detailed analysis. The computer vision processing methods or processes may be adjusted (operation 415) based at least in part on the identity of the object of interest to produce further analysis result (e.g., worker behavior, PPE verification, equipment movement tracking, etc.). The computer vision processing may also be adjusted such that identity recognition or facial recognition may not be performed on the object of interest.

If the identity is not available, the visual input 405 may be provided by the computer vision system at a default setting (e.g., full field of view) and computer vision processing may be performed (operation 407) to generate a computer vision input data to the interference engine 409. The inference engine can be the same as the inference engine as described elsewhere herein. The inference engine may process the RTLS input, CV input data and LIDAR input 417 and output a safety related result. Because the identity is not available from RTLS in this case, the inference engine may perform additional computation to infer the identity or other computation to output a safety related result in the absence of an identity.

Although FIG. 4 shows a method in accordance with some embodiments a person of ordinary skill in the art will recognize that there are many adaptations for various embodiments. For example, the operations can be performed in any order. Some of the operations may be precluded, some of the operations may be performed concurrently in one step, some of the operations repeated, and some of the operations may comprise sub-steps of other operations. For example, the operation of adjusting the visual input or spatial resolution may be performed concurrently.

Figure 5:
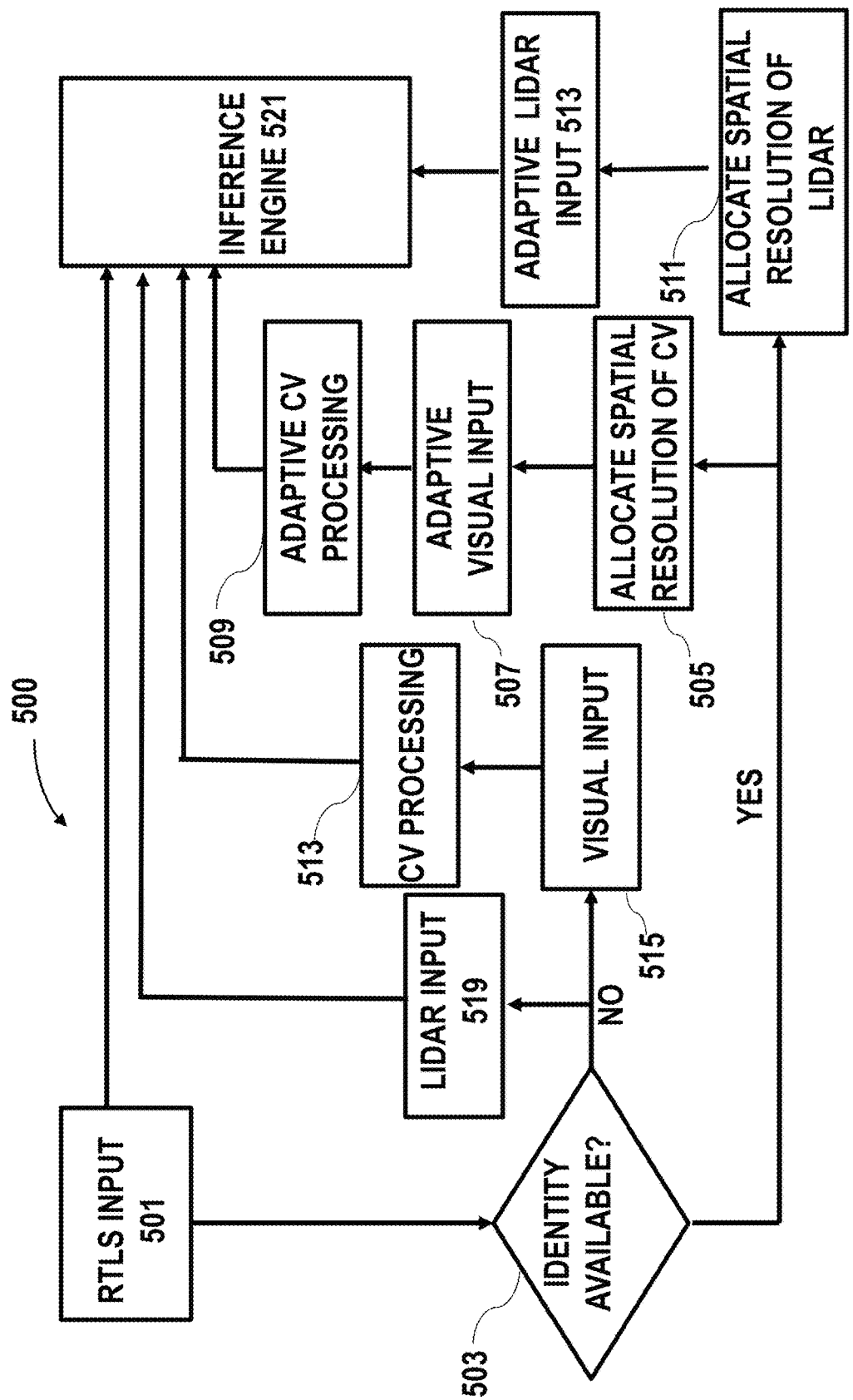
FIG. 5 illustrates an example of another method for providing adaptive multimodal safety analysis, in accordance with some embodiments of the present disclosure.

FIG. 5 illustrates an example of another method 500 for providing adaptive multimodal safety analysis, in accordance with some embodiments of the present disclosure. The method may comprise receiving input data 501 from a real-time locating system. The RTLS input data 501 may be processed to extract identity of an object of interest in a 3D scene (e.g., construction site) and the associated location data (operation 503).

If the identity and the location data is available, higher spatial resolution of the computer vision component may be allocated to a region that presents the object of interest (operation 505), and the visual input provided by the computer vision component may be adjusted (operation 507). The visual input may be adjusted by controlling one or more acquisition parameters of the visual input device (e.g., camera zoom level, frame rate, focal length, tilt/pan angle, etc.) to track the object of interest and to provide image data with higher resolution for further detailed analysis. The computer vision processing methods or processes may be adjusted (operation 509) based at least in part on the identity of the object of interest to produce further analysis result (e.g., worker behavior, PPE verification, equipment movement tracking, etc.). The computer vision processing may also be adjusted such that identity recognition or facial recognition may not be performed on the object of interest thereby saving the computational power.

In response to determining the identity and the location data is available, the pixel distribution of the LIDAR system is adjusted (operation 511). For instance, higher spatial resolution may be allocated to a region that presents the object of interest to provide details in the region of interest. In some cases, the LIDAR input data 513 may also be adjusted based at least in part on the identity of the object of interest by performing further analysis (e.g., collision avoidance if the identity indicates a worker).

If the identity is not available, the visual input 515 may be provided by the computer vision system at a default setting (e.g., full field of view) and computer vision processing may be performed (operation 513) to generate a computer vision input data to the interference engine 521. Similarly, LIDAR input data 519 may be generated at a default setting and supplied to the inference engine. The inference engine can be the same as the inference engine as described elsewhere herein. The inference engine may process the RTLS input, CV input data and LIDAR input and output a safety related result. In the case that the identity is not available from RTLS, the inference engine may perform additional computation to infer the identity or other computation to output a safety related result in the absence of an identity.

Another aspect of the present disclosure provides an integrated safety management platform for generating real-time alerts, logging safety related events in a database, archiving video and images at the time of a safety related event, controlling workflow, detecting, predicting and managing risks in a workplace. The integrated real-time platform may employ the adaptive multimodal framework as described above for improving safety monitoring and management. The integrated real-time platform may help workers, managers or operators to comply with safety protocols and improve worker situational awareness for hazardous work and enforce pro-active safety behaviors based on real-time tracking and unsafe situation detection. The safety management platform may provide various functionalities including, for example, detecting an adverse event (e.g., fall or trip detection), predicting and forecasting hazardous condition in a work zone, enforcing behavior change through coaching to comply with safety laws and the like. In some cases, at least some of the above-mentioned functionalities may employ machine learning techniques to process multimodal sensory data as described elsewhere herein.

In some embodiments, the safety management platform may be capable of performing adverse event prediction and detection that adapt to individuals in a remote and/or hazardous workplace. In some embodiments, one or more functionalities of the safety management platform may involve using predictive models. For example, the adaptive adjustment of multimodal sensory systems, detection of an incident (e.g., trip, slip, fall), detection of a fatigue level, predicting or forecasting a hazardous condition in a work zone may be provided using a predictive model. A predictive model may be a trained model or trained using machine learning algorithm. The machine learning algorithm can be any type of machine learning approach such as: a support vector machine (SVM), a naïve Bayes classification, a linear regression model, a quantile regression model, a logistic regression model, a random forest, a neural network, convolutional neural network CNN, recurrent neural network RNN, a gradient-boosted classifier or repressor, or another supervised or unsupervised machine learning algorithm (e.g., generative adversarial network (GAN), Cycle-GAN, etc.

In some cases, the safety management platform may include a backend management system for training one or more predictive models. In some cases, the backend management system may perform continual training or improvement after deployment. In some cases, the predictive model provided by the platform may be dynamically adjusted and tuned to adapt to different individuals, different deployment environment, or different worksites conditions over time. The predictive model provided by the platform may be improved continuously over time (e.g., during implementation, after deployment). Such continual training and improvement may be performed automatically with little user input or with user intervention by involving supervisors and managers as validators of the logged safety related events to accumulate the statistics of true positives, false positives, true negatives and false negatives. Negative events are safety related events that normally would not be logged because no safety related infraction was detected or predicted, or if the system confidence level was below the threshold to generate an event, and only generated for validation purposes at random time intervals or predetermined time intervals. The safety management platform may also allow remote supervisors and managers, or remote entities to monitor safety related event occurrence. Backend management system can be applied in various scenarios such as in cloud or an on-premises environment.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. An adaptive multimodal system for managing safety in an industrial environment comprising:
   (a) a computer vision component for generating a computer vision output data;
   (b) a real-time locating component configured for generating location data and identity data about an object within the industrial environment, wherein the identity data is provided by a mobile tag device carried by the object;
   (c) a light detection and ranging (LIDAR) component for generating 3D point cloud data of the industrial environment; and
   (d) one or more processors coupled to the computer vision component, the real-time locating component and the LIDAR component and wherein the one or more processors are configured to:
      adjust, based at least in part on the location data and the identity data about the object generated in (b), a density distribution of pixels for acquiring the 3D point cloud data, and
      adjust, based at least in part on the location data and the identity data about the object generated in (b), at least one of a process for generating the computer vision output data, or one or more parameters for acquiring an image data by the computer vision component.

2. The adaptive multimodal system of claim 1, wherein the process for generating the computer vision output data is adjusted by not recognizing the identity of the object using computer vision techniques.

3. The adaptive multimodal system of claim 2, wherein the one or more processors are configured to further adjust a computational resource allocated to the computer vision component.

4. The adaptive multimodal system of claim 1, wherein the process for generating the computer vision output data is adjusted by performing action recognition or objection recognition for the object based at least in part on the identity data to determine whether the object complies with a safety protocol.

5. The adaptive multimodal system of claim 1, wherein the computer vision output data comprises a description of the industrial environment.

6. The adaptive multimodal system of claim 1, wherein the one or more parameters for acquiring the image data include a spatial resolution for acquiring the image data, a zoom level, a or region of interest to zoom-in.

7. The adaptive multimodal system of claim 6, wherein the one or more processors are configured to further generate a control command to an imaging device of the computer vision component to adjust the one or more parameters.

8. The adaptive multimodal system of claim 1, wherein the real-time locating component comprises one or more reference point devices deployed within the industrial environment.

9. The adaptive multimodal system of claim 1, wherein the mobile tag device further detects an orientation or motion state of the object.

10. The adaptive multimodal system of claim 1, wherein the density distribution of pixels for acquiring the 3D point cloud data is adjusted by controlling a scanning pattern of the LIDAR component.

11. A method for managing safety in an industrial environment comprising:
    (a) generating a computer vision output data using a computer vision component;
    (b) generating location data and identity data about an object within the industrial environment using a real-time locating component, wherein the identity data is provided by a mobile tag device carried by the object;
    (c) generating 3D point cloud data of the industrial environment using a light detection and ranging (LIDAR) component;
    (d) adjusting, based at least in part on the location data and the identity data about the object generated in (b), a density distribution of pixels for acquiring the 3D point cloud data, and
    (e) adjusting, based at least in part on the location data and the identity data about the object generated in (b), at least one of a process for generating the computer vision output data, or one or more parameters for acquiring an image data by the computer vision component.

12. The method of claim 11, wherein adjusting the process for generating the computer vision output data comprises not using computer vision techniques for recognizing the identity of the object.

13. The method of claim 12, further comprising adjusting a computational resource allocated to the computer vision component.

14. The method of claim 11, wherein adjusting the process for generating the computer vision output data comprises performing action recognition or objection recognition for the object based at least in part on the identity data to determine whether the object complies with a safety protocol.

15. The method of claim 11, wherein the computer vision output data comprises a description of the industrial environment.

16. The method of claim 11, wherein the one or more parameters for acquiring the image data include a spatial resolution for acquiring the image data, a zoom level, a or region of interest to zoom-in.

17. The method of claim 16, further comprising generating a control command to an imaging device of the computer vision component to adjust the one or more parameters.

18. The method of claim 11, wherein the real-time locating component comprises one or more reference point devices deployed within the industrial environment.

19. The method of claim 11, wherein the mobile tag device further detects anorientation or motion state of the object.

20. The method of claim 11, wherein adjusting the density distribution of pixels for acquiring the 3D point cloud data comprises controlling a scanning pattern of the LIDAR component.

\* \* \* \* \*